United States Patent
Wolf et al.

(10) Patent No.: US 12,243,411 B2
(45) Date of Patent: Mar. 4, 2025

(54) MONITORING A SELF-TESTING FIRE SENSING DEVICE

(71) Applicant: Honeywell International Inc., Charlotte, NC (US)

(72) Inventors: Benjamin H. Wolf, Leicester (GB); Michael Barson, Nuneaton (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/214,599

(22) Filed: Jun. 27, 2023

(65) Prior Publication Data

US 2025/0006040 A1   Jan. 2, 2025

(51) Int. Cl.
  *G08B 29/14* (2006.01)
  *G01J 1/42* (2006.01)

(52) U.S. Cl.
  CPC ............. *G08B 29/145* (2013.01); *G01J 1/42* (2013.01); *G01J 2001/4252* (2013.01)

(58) Field of Classification Search
  CPC .... G08B 29/145; G01J 1/42; G01J 2001/4252
  USPC ....................................................... 340/506
  See application file for complete search history.

(56) References Cited

U.S. PATENT DOCUMENTS

| | | | | |
|---|---|---|---|---|
| 5,673,027 A | * | 9/1997 | Morita | G08B 17/103 |
| | | | | 340/630 |
| 8,145,444 B1 | * | 3/2012 | Bickford | G05B 23/0235 |
| | | | | 702/182 |
| 9,360,449 B2 | | 6/2016 | Duric | |
| 10,670,745 B1 | | 6/2020 | Catarius et al. | |
| 10,825,334 B2 | * | 11/2020 | Pedersen | G08B 29/043 |
| 11,127,284 B1 | * | 9/2021 | Barson | G08B 17/107 |
| 11,676,466 B2 | | 6/2023 | Dearden et al. | |
| 2019/0297710 A1 | * | 9/2019 | Crenshaw | F21V 23/02 |
| 2022/0005344 A1 | | 1/2022 | Barson et al. | |
| 2022/0397525 A1 | | 12/2022 | Culp et al. | |

(Continued)

FOREIGN PATENT DOCUMENTS

| | | |
|---|---|---|
| CN | 107085929 A | 8/2017 |
| EP | 0755037 B1 | 5/2000 |

(Continued)

*Primary Examiner* — Kerri L McNally
(74) *Attorney, Agent, or Firm* — Brooks, Cameron & Huebsch, PLLC

(57) ABSTRACT

Devices, methods, and systems for monitoring a self-testing fire sensing device are described herein. One device includes a memory, and a processor configured to execute instructions stored in the memory to receive, from a self-testing fire sensing device, measurements of outputs of light-emitting diodes (LEDs) of the self-testing fire sensing device during operation of the self-testing fire sensing device, determine when a deviation in the measured outputs of the LEDs of the self-testing fire sensing device meets or exceeds a threshold deviation amount, determine an action to take on the self-testing fire sensing device upon determining the deviation in in the measured outputs of the LEDs meets or exceeds the threshold deviation amount, and send a notification of the determined action to take on the self-testing fire sensing device to an additional computing device.

20 Claims, 5 Drawing Sheets

(56) References Cited

U.S. PATENT DOCUMENTS

2023/0230468 A1* 7/2023 Werner ................ G08B 29/145
340/506

FOREIGN PATENT DOCUMENTS

| EP | 3916691 | A1 | 12/2021 |
| EP | 3825972 | B1 | 3/2023 |

* cited by examiner

MONITORING A SELF-TESTING FIRE SENSING DEVICE

TECHNICAL FIELD

The present disclosure relates generally to devices, methods, and systems for monitoring a self-testing fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms. Fire sensing devices can include one or more sensors. The one or more sensors can include an optical smoke sensor, a heat sensor, a gas sensor, and/or a flame sensor, for example.

Over time components of a fire sensing device can degrade and/or become contaminated and fall out of their initial operational specifications. For example, an output of a light-emitting diode (LED) used in an optical scatter chamber of a smoke detector can degrade with age and/or use. These degraded components can prevent the fire sensing device from detecting a fire at an early enough stage. As such, codes of practice may require sensitivity testing (e.g., alarm threshold verification testing) of smoke detectors at regular intervals to ensure they are functioning properly. However, accurate sensitivity testing on site can be impractical due to access problems and the need to deploy special equipment to carry out the testing. Consequently, rudimentary functionality tests are often done in lieu of accurate sensitivity tests, which can be misleading by inaccurately depicting the sensitivity of a smoke detector as being verified.

Further, in some jurisdictions, because an accurate sensitivity measurement of the smoke detector may not be able to be determined and/or testing may not be able to be performed, fire sensing devices are required to be replaced after a particular time period. For example, in Germany, even the most advanced smoke detector must be replaced after 8 years, even though the device may still be performing accurately. This can be costly, and can create unnecessary waste which can negatively impact the environment.

DETAILED DESCRIPTION

Figure 1:
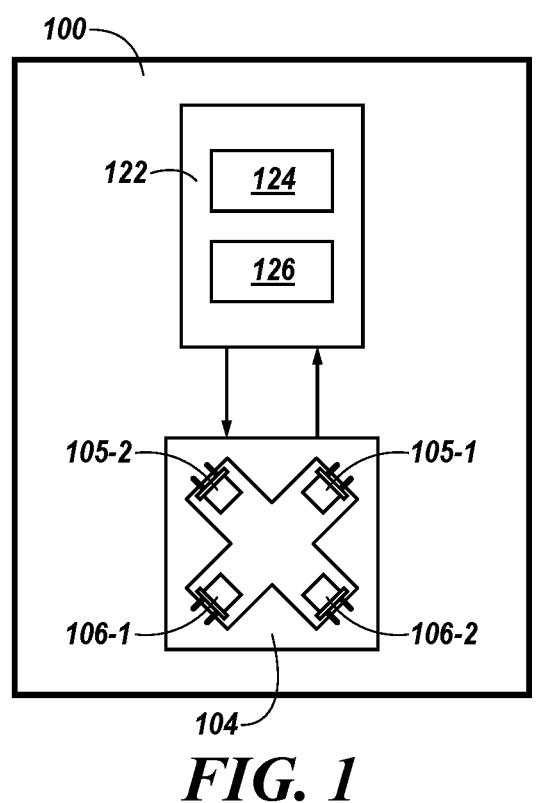
FIG. 1 illustrates a block diagram of a self-testing fire sensing device in accordance with an embodiment of the present disclosure.

Devices, methods, and systems for monitoring a self-testing fire sensing device are described herein. One device includes a memory, and a processor configured to execute instructions stored in the memory to receive, from a self-testing fire sensing device, measurements of outputs of light-emitting diodes (LEDs) of the self-testing fire sensing device during operation of the self-testing fire sensing device, determine when a deviation in the measured outputs of the LEDs of the self-testing fire sensing device meets or exceeds a threshold deviation amount, determine an action to take on the self-testing fire sensing device upon determining the deviation in in the measured outputs of the LEDs meets or exceeds the threshold deviation amount, and send a notification of the determined action to take on the self-testing fire sensing device to an additional computing device.

In contrast to previous smoke detectors in which a maintenance engineer would have to manually test sensitivity of a smoke detector and replace the smoke detector if the smoke sensitivity was incorrect, fire sensing devices (e.g., smoke detectors) in accordance with the present disclosure can test, calibrate, and/or recalibrate themselves. Such fire sensing devices are referred to herein and self-testing fire sensing devices, and their self-test functionality will be further described herein.

Further, embodiments of the present disclosure can monitor such self-testing fire sensing devices (e.g., the components of the device) to determine when the device may need to be recalibrated and/or replaced. For example, embodiments of the present disclosure can monitor (e.g. remotely monitor) the outputs (e.g., sensitivity levels) of the LEDs of a self-testing fire sensing device over time during operation of the device in order to determine when recalibration and/or replacement of the device may be needed due to, for instance, contamination and/or degradation (e.g., aging). For instance, embodiments of the present disclosure can determine that recalibration and/or replacement of the device may be needed when the outputs of the LEDs deviate by more than a permissible amount.

Accordingly, such self-testing fire sensing devices in accordance with the present disclosure may take significantly less maintenance time to test and can be tested, calibrated, and/or recalibrated continuously and/or on demand, and can more accurately detect an actual fire. Further, monitoring such self-testing fire sensing devices in accordance with the present disclosure can extend the service lives of the devices such that they need to be replaced less often, which can result in a positive environmental impact and/or cost savings.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a self-testing fire sensing device 100 in accordance with an embodiment of the present disclosure. The fire sensing device 100 includes a controller 122, and an optical scatter chamber 104 having light emitting diodes (LEDs) 105-1 and 105-2 and photodiodes 106-1 and 106-2. Controller 122 can be, for instance, a microcontroller.

The controller 122 can include a memory 124, and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to test, monitor, calibrate, and/or recalibrate a fire sensing device 100 in accordance with the present disclosure. For instance, processor 126 can execute the executable instructions stored in memory 124 to measure the outputs of LEDs 105-1 and 105-2, and send (e.g., transmit) the measured outputs to a computing device (e.g., computing device 448 and/or 548 described in connection with FIGS. 4 and 5, respectively). The measured outputs of LEDs 105-1 and 105-2 can be, for example, the sensitivity levels LEDs 105-1 and 105-2, such as the emission and/or scatter levels of light emitted by LEDs 105-1 and 105-2.

For example, the optical scatter chamber 104 can include LEDs 105-1 and 105-2 and photodiodes 106-1 and 106-2 to measure an aerosol density level in optical scatter chamber 104 by detecting scatter. Scatter can be light emitted from the LEDs 105-1 and/or 105-2 reflecting, refracting, and/or diffracting off of particles in chamber 104, and can be received by the photodiodes 106-1 and/or 106-2. The amount of light received by the photodiodes 106-1 and/or 106-2 can be used to determine the aerosol density level.

For example, LED 105-1 can emit a first light and LED 105-2 can emit a second light. In some embodiments, LED 105-1 can be an infrared (IR) LED that emits IR light, and LED 105-2 can be a blue LED that emits visible light. As shown in FIG. 1, photodiode 106-1 can be on-axis with (e.g., directly across from) LED 105-1 such that photodiode 106-1 directly receives the first light and receives a scattering of the second light. Photodiode 106-2 can be on-axis with LED 105-2 such that photodiode 106-2 directly receives the second light and receives a scattering of the first light. Photodiode 106-1 can detect an LED emission level of the first light and detect a scatter level of the second light. Photodiode 106-2 can detect an LED emission level of the second light and detect a scatter level of the first light.

LEDs 105-1 and 105-2, which may be referred to herein collectively as LEDs 105, can have varying LED emission levels due to, for example, manufacturing variations. As such, LEDs 105 may be calibrated prior to use. The fire sensing device 100 can calibrate the LEDs 105 by having a known aerosol density level injected into the optical scatter chamber 104. The photodiodes 106-1 and 106-2, which may be referred to herein collectively as photodiodes 106, can detect scatter levels and the controller 122 can compare the detected scatter levels with the known aerosol density level to calculate a sensitivity for each scatter path. For example, LED 105-1 can emit a first light and photodiode 106-2 can detect the scatter level from the first light scattering off of the particles of the known aerosol density level. The controller 122 can calculate a sensitivity, based on the detected scatter level and the known aerosol density level, for the scatter path of LED 105-1 to photodiode 106-2. The controller 122 can similarly calculate a sensitivity for the scatter path of LED 105-2 to photodiode 106-1 and store the sensitivity. The sensitivity for each scatter path can be stored in memory 124.

In some examples, the sensitivity can be improved by adjusting (e.g., changing) a gain (e.g., a software gain function) associated with a photodiode 106. For instance, the sensitivity can be improved by recalibrating a gain used to amplify the input signal of a photodiode 106. For example, the gain can be increased to increase the voltage and/or current of the input signal of photodiode 106-2 to detect the first light from LED 105-1 as the first light from LED 105-1 weakens over time. The gain can be recalibrated responsive to the detected scatter level and/or LED emission level. For example, the gain can be recalibrated responsive to a calculated sensitivity of a scatter path being less than a threshold sensitivity. As an additional example, the gain can be adjusted responsive to a deviation in the measured outputs of LEDs 105 meeting or exceeding a threshold deviation amount, as will be further described herein.

Figure 3:
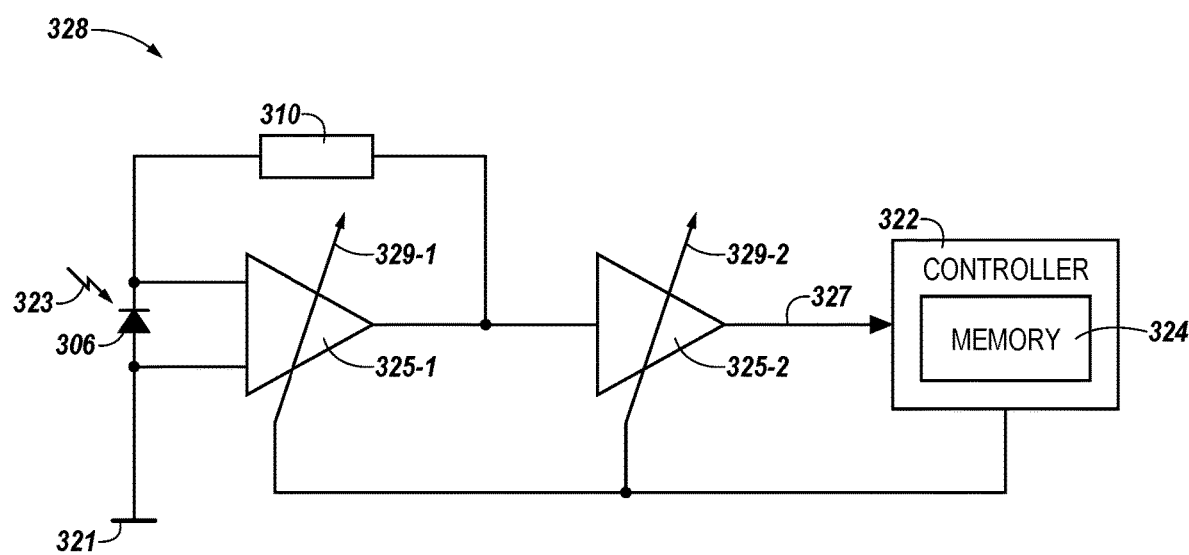
FIG. 3 illustrates circuitry of a self-testing fire sensing device in accordance with an embodiment of the present disclosure.

In some embodiments, controller 122 can adjust the gain associated with a photodiode 106 by adjusting a gain (e.g., selecting between a number of gains) of a variable gain amplifier (e.g., operational amplifiers 325-1 and/or 325-2 further described in FIG. 3). In some examples, detecting an LED emission level of an on-axis LED 105 can require less gain than detecting scatter of an off-axis LED 105 because the light from the on-axis LED 105 is direct light (e.g., higher intensity) and the light from the off-axis LED 105 is indirect light (e.g., lower intensity). For example, photodiode 106-1 can use a first gain to detect an LED emission level of the first light from LED 105-1 or use a second gain to detect a scatter level of the second light from LED 105-2. Similarly, photodiode 106-2 can use a first gain to detect an LED emission level of the second light from LED 105-2 or use a second gain to detect a scatter level of the first light from LED 105-1.

In some embodiments, a fault (e.g., an error) can be triggered responsive to a detected LED emission level or a detected scatter level. For example, the controller 122 can compare the detected LED emission level to a threshold LED emission level and trigger a fault responsive to the detected LED emission level being below the threshold LED emission level. Another example can include the controller 122 comparing the detected LED emission level to a previously detected LED emission level and triggering a fault responsive to the detected LED emission level being less than the previously detected LED emission level.

The gain(s) used by photodiodes 106 can be stored in memory 124. Over time LED emission levels of LEDs 105 can decrease, reducing the received light by the photodiodes 106, which could lead to the fire sensing device 100 malfunctioning.

The gain(s) used by photodiode 106 for detecting scatter levels can be adjusted (e.g., recalibrated) as the LEDs 105 degrade over time. Controller 122 can recalibrate the gain responsive to the detected LED emission level and/or the detected scatter level. For example, the controller 122 can initiate a recalibration of the gain responsive to comparing the detected LED emission level to a threshold LED emission level and determining the detected LED emission level is below the threshold LED emission level. In some examples, the controller 122 can recalibrate the gain responsive to determining a difference between the detected LED emission level and the initial detected LED emission level is greater than a threshold value and/or responsive to determining the detected LED emission level is less than a previously detected LED emission level. As an additional example, controller 122 can adjust the gain responsive to a deviation in the measured outputs of the LEDs meeting or exceeding a threshold deviation amount, as will be further described herein.

Figure 2:
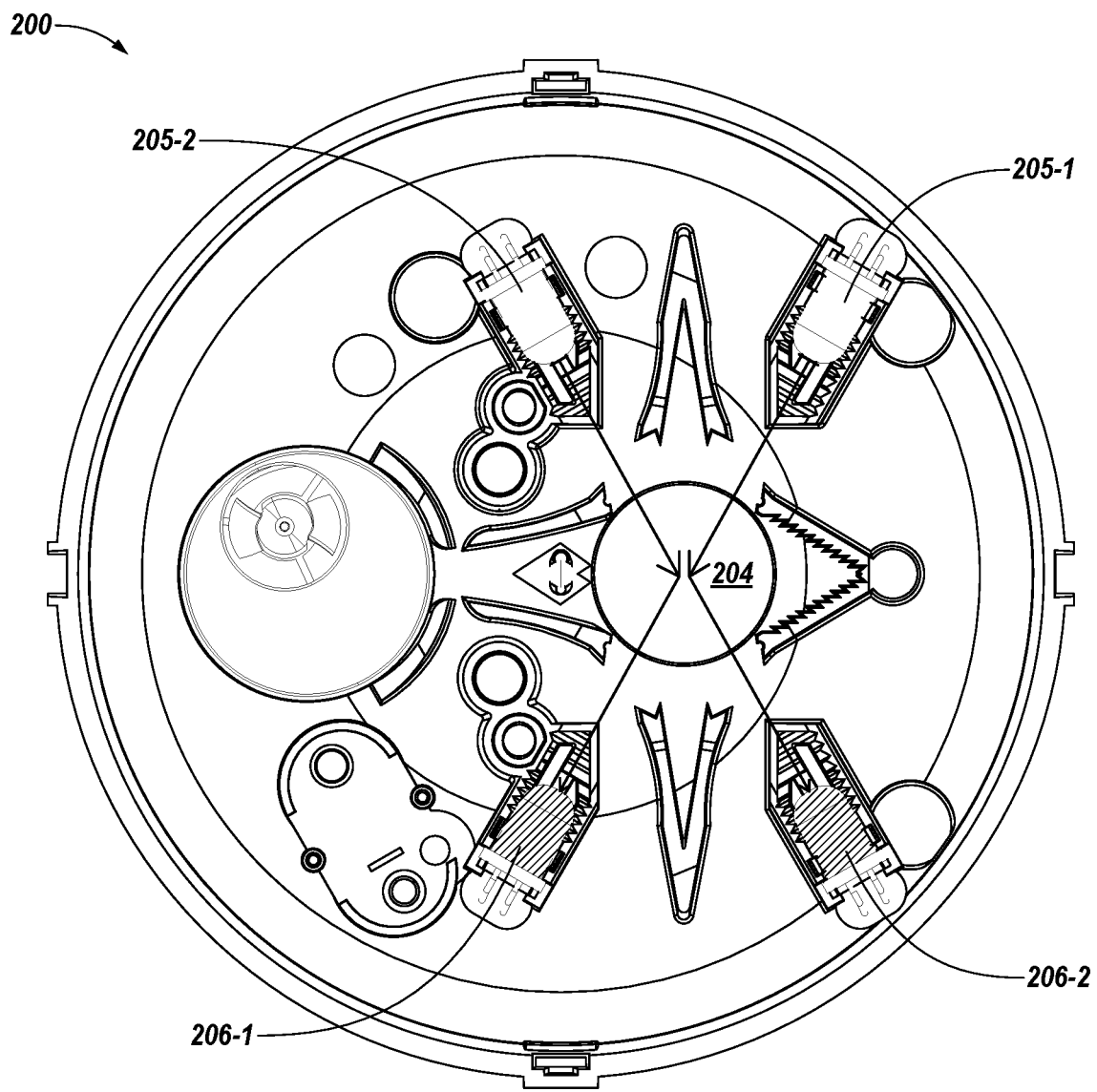
FIG. 2 illustrates an example of a self-testing fire sensing device in accordance with an embodiment of the present disclosure.

FIG. 2 illustrates an example of a self-testing fire sensing device 200 in accordance with an embodiment of the present disclosure. The fire sensing device 200 can be, but is not limited to, a fire and/or smoke detector of a fire control system, and can be, for instance, self-testing fire sensing device 100 previously described in connection with FIG. 1. The self-testing fire sensing device 200 illustrated in FIG. 2 can be a dual optical smoke chamber. In some examples, the fire sensing device 200 can use two scatter angles and/or two wavelengths.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

A fire sensing device 200 can automatically or upon command conduct one or more tests contained within the fire sensing device 200. The one or more tests can determine whether the fire sensing device 200 is functioning properly, requires maintenance, and/or requires recalibration.

As shown in FIG. 2, fire sensing device 200 can include an optical scatter chamber 204 including LEDs 205-1 and 205-2 and photodiodes 206-1 and 206-2, which can correspond to the optical scatter chamber 104, the LEDs 105-1 and 105-2, and the photodiodes 106-1 and 106-2 of FIG. 1, respectively. As previously described, detected LED emission levels and/or scatter levels can be used to determine whether fire sensing device 200 requires maintenance and/or recalibration.

In some examples, the fire sensing device 200 can generate and send a message if the device requires maintenance and/or recalibration. As an additional example, the fire sensing device 200 can include a user interface that can display the message.

The fire sensing device 200 of FIG. 2 includes LED 205-1, LED 205-2, photodiode 206-1, and photodiode 206-2. LED 205-1 can emit a first light and LED 205-2 can emit a second light. For example, LED 205-1 can be an infrared (IR) LED that emits IR light and LED 205-2 can be a blue LED that emits visible light. Using two or more different types of light (e.g., light having different wavelengths) can help the fire sensing device 200 detect various types of smoke. For example, light having a first wavelength can better detect a flaming fire including back aerosol and light having a second wavelength can better detect water vapor including white non-fire aerosol. In some examples, a ratio of the first wavelength and the second wavelength can be used to indicate the type of smoke.

As shown in FIG. 2, photodiode 206-1 can be on-axis with LED 205-1 such that photodiode 206-1 directly receives the first light emitted from LED 205-1 and receives a scatter of the second light emitted by LED 205-2, and photodiode 206-2 can be on-axis with LED 205-2 such that photodiode 206-2 directly receives the second light emitted by LED 205-2 and receives a scatter of the first light emitted by LED 205-1. Photodiode 206-1 can detect an emission level of the first light and detect a scatter level of the second light. Photodiode 206-2 can detect an LED emission level of the second light and detect a scatter level of the first light.

LEDs 205-1 and 205-2, which may be referred to herein collectively as LEDs 205, can have varying emission levels due to, for example, manufacturing variations. As such, LEDs 205 may require calibration prior to use. The fire sensing device 200 can calibrate the LEDs 205 by using a known aerosol density level, as described above. The photodiodes 206-1 and 206-2, which may be referred to herein collectively as photodiodes 206, can detect scatter levels, which can be compared with the known aerosol density level to calculate a sensitivity for each scatter path.

In some examples, the sensitivity accuracy can be improved by adjusting a gain used to amplify the input signal of a photodiode 206. The gain can be recalibrated responsive to the LED emission level, as previously described herein. As an additional example, the gain can be adjusted responsive to a deviation in the measured outputs of LEDs 205 meeting or exceeding a threshold deviation amount, as will be further described herein.

The gain can be adjusted by adjusting a gain of a variable gain amplifier (e.g., operational amplifiers 325-1 and 325-2 further described in FIG. 3). In some examples, detecting an LED emission level of an on-axis LED 205 can require less gain than detecting scatter of an off-axis LED 205 because the light from the on-axis LED 205 is direct light (e.g., higher intensity) and the light from the off-axis LED 205 is indirect light (e.g., lower intensity), as previously described herein.

FIG. 3 illustrates circuitry 328 of a self-testing fire sensing device (e.g., fire sensing devices 100 and/or 200 described in connection with FIGS. 1 and 2, respectively) in accordance with an embodiment of the present disclosure. As shown in FIG. 3, circuitry 328 can include a photodiode 306 corresponding to photodiode 106 in FIG. 1 and photodiode 206 in FIG. 2. Each photodiode in a self-testing fire sensing device can have corresponding circuitry 328. Circuitry 328 can further include a configurable impedance network 310 associated with one or more operational amplifiers (op-amps) 325-1, 325-2, which can act as variable gain amplifiers, reference voltage 321, an input signal 323, and an output signal 327. Circuitry 328 (e.g., the operation of circuitry 328) can be controlled by controller 322, which can correspond to controller 122 in FIG. 1.

As previously discussed, detecting an LED emission level of an on-axis LED may require less gain than detecting a scatter level of an off-axis LED because the light from the on-axis LED is direct light (e.g., higher intensity) and the light from the off-axis LED is indirect (e.g., scattered) light (e.g., lower intensity). Controller 322 can adjust the gains 329-1 and/or 329-2 of op-amps 325-1 and/or 325-2, respectively, responsive to whether the fire sensing device (e.g., photodiode 306) is detecting an LED emission level or detecting a scatter level. For example, the op-amp 325-1 can be configured as a transimpedance amplifier (TIA) with a variable gain 329-1, so that when an input signal 323, which can be a short pulse of light of about 100 microseconds, is detected by the photodiode 306, a proportional photocurrent will follow in the photodiode 306. The inverting input of op-amp 325-1 can then become less than the reference voltage 321 of the non-inverting input. The op-amp 325-1 can increase its output voltage in order to supply the photocurrent via the configurable impedance network 310. The output voltage on the op-amp 325-1 is equal to the product of the photocurrent times the impedance of the configurable impedance network 310. Controller 322 can change the impedance of the configurable impedance network 310 and hence the photocurrent to voltage gain of the op-amp 325-1.

An additional op-amp 325-2 can be configured as a non-inverting amplifier, which further amplifies the output voltage from the op-amp 325-1. The output signal 327 from the op-amp 325-2 can be measured by the controller 322, and the gain 329-2 of the op-amp 325-2 can be determined by controller 322.

Emitted light from an LED may decrease over time. The controller 322 can select a very low gain, measure the output signal 327 corresponding to the direct output levels from an LED, then recalibrate its software gain function associated with the high hardware gain, for the scatter level. As such, the change in the LED emission level can be compensated for by a change in software gain function by the controller 322, for example, with an 8 bit resolution or 256 possible gain settings. As an additional example, controller 322 can change the software gain function responsive to a deviation in the LED output meeting or exceeding a threshold deviation amount, as will be further described herein. The changed gains can be stored in memory 324 of controller 322, which can correspond to memory 122 in FIG. 1.

Figure 4:
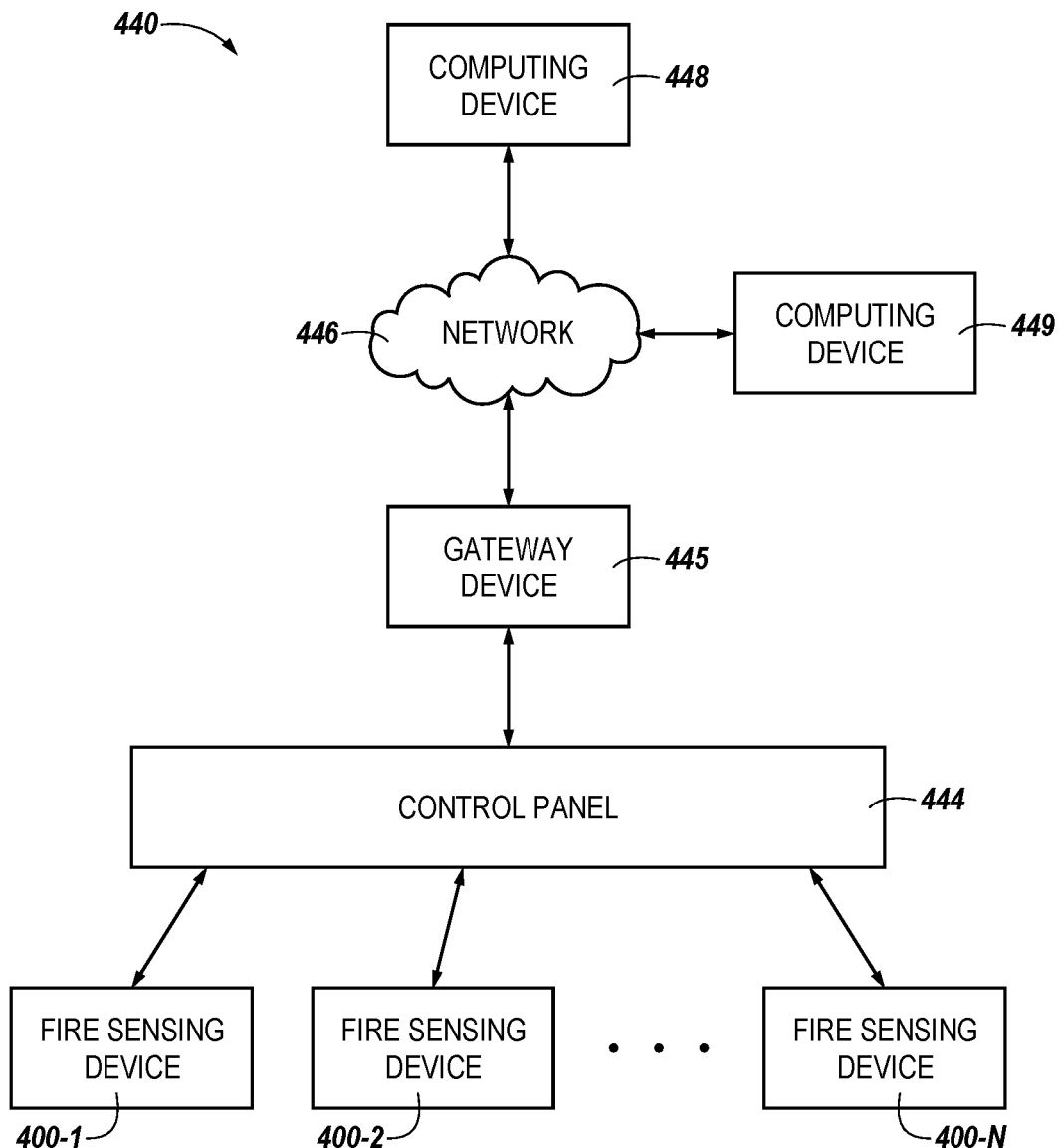
FIG. 4 illustrates an example of a fire alarm system in accordance with an embodiment of the present disclosure.

FIG. 4 illustrates an example of a fire alarm system 440 in accordance with an embodiment of the present disclosure. As shown in FIG. 4, fire alarm system 440 can include a plurality of fire sensing devices 400-1, 400-2, . . . , 400-N (which may be collectively referred to herein as fire sensing devices 400). Fire sensing devices 400 can be located in (e.g., throughout) a facility (e.g., in different areas and/or on different floors of the facility). The facility can be, for instance, a large facility (e.g., building) having a large number of floors, such as a commercial facility, office building, hospital, and the like. However, embodiments of the present disclosure are not limited to a particular type of facility.

Fire sensing devices can be used to detect (e.g., sense) a fire occurring in the facility. For example, fire sensing devices 400 can be self-testing fire sensing devices 100 and/or 200 previously described in connection with FIGS. 1 and 2, respectively.

For example, fire sensing devices 400 can each include a first LED and a second LED, and a first photodiode and a second photodiode, as previously described herein (e.g., in connection with FIGS. 1 and 2). As previously described herein, each fire sensing device 400 (e.g., the controller of each respective fire sensing device 400) can measure the outputs (e.g. sensitivity levels) of its LEDs. For instance, each fire sensing device 400 can periodically (e.g., repeatedly) measure the outputs of its LEDs during (e.g., at different points over a period of time during) operation of the fire sensing device 400.

As shown in FIG. 4, fire alarm system 440 can include a control panel (e.g., fire control panel) 444. Control panel 444 can be, for instance, a physical control panel, such as a control box, installed in the facility.

Control panel 444 can be used (e.g., by a user) to monitor and/or control fire sensing devices 400. For instance, control panel 444 can receive (e.g., collect) data, such as, for instance, real-time operational data, from fire sensing devices 400. Such data can include, for instance, the measured outputs of the LEDs of fire sensing devices 400. For example, each fire sensing device 400 can continuously send its measured LED outputs to control panel 444.

As shown in FIG. 4, fire alarm system 440 can include a gateway device 445. Gateway device 445 can be connected to control panel 444, and can communicate with control panel 444 to receive the data (e.g., the measured output of the LEDs) from the fire sensing devices 400 collected by control panel 444. In some embodiments, gateway device 445 can be permanently installed and/or connected at the facility, such that it can continuously send (e.g., push) the data collected by control panel 444 (e.g., the measured outputs of the LEDs of fire sensing devices 400) to a centralized computing device (e.g., computing device 448 illustrated in FIG. 4) for monitoring of the fire sensing devices 400.

As shown in FIG. 4, fire alarm system 440 can include a computing device 448. Computing device 448 can be located remotely from the facility and, in some embodiments, can be part of a centralized management platform. For instance, computing device 448 can be part of a distributed (e.g., cloud) computing environment.

Gateway device 445 can communicate with computing device 448 via network 446, as illustrated in FIG. 4. For example, gateway device 445 can send (e.g., continuously transmit and/or upload) the data (e.g., the measured output of the LEDs) from the fire sensing devices 400 collected by control panel 444 to computing device 448. That is, each fire sensing device 400 can send the measured outputs of its LEDs to computing device 448 via gateway device 445.

Network 446 can be a network relationship through which gateway device 445 and computing device 448 can communicate.

Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, network 446 can include a number of servers that receive information from, and transmit information to, gateway device 445 and computing device 448 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Computing device 448 can use the measured outputs of the LEDs received from fire sensing devices 400 to monitor the fire sensing devices 400. For example, computing device 448 can determine when a deviation (e.g., change) in the measured outputs of any of the LEDs of a fire sensing device 400 meets or exceeds a threshold (e.g., permissible) deviation amount. For instance, computing device 440 can generate a trend line associated with (e.g., corresponding to the change in) the measured outputs of the LEDs of the fire sensing device over time, and determine when a deviation in the trend line meets or exceeds the threshold deviation amount. The trend line can be generated by, for instance, performing noise averaging on the measured outputs of the LEDs, and performing a rate of change analysis on the measured outputs of the LEDs (e.g., after the noise averaging has been performed).

The deviation in the measured outputs of the LEDs can comprise percentages by which the outputs of the LEDs have changed (e.g., increased or decreased) from an initial (e.g., initially calibrated) output. For example, determining when the deviation in the measured output of the LEDs of a fire sensing device 400 meets or exceeds the threshold deviation amount can include determining when the percentage by which the output of the LEDs have changed from the initial output is outside a threshold percentage range. As an additional example, determining when the deviation in the measured output of the LEDs of a fire sensing device 400 meets or exceeds the threshold deviation amount can include determining when the difference between the percentages by which the outputs of the LEDs have changed from their initial output meets or exceeds a threshold percentage difference.

The threshold percentage range and the threshold percentage difference can correspond to whether the measured output of the LEDs of the fire sensing device is the emission level of the light emitted by the LEDs or the scatter level of the light emitted by the LEDs. As an example, the threshold percentage range can be from +10% to −30% of the initial emission level of the LEDs, and the threshold percentage difference can be +/−15% of the initial emission level difference of the LEDs (e.g., the emission level deviation of the LEDs of the fire sensing device would be determined to meet or exceed the threshold deviation amount if their measured emission level was more than 10% greater or 30% less than their initial emission level, or if the difference between their measured emission levels was at least 15%). As an additional example, the threshold percentage range can be from +10% to −20% of the initial scatter level of the LEDs, and the threshold percentage difference can be +/−30% of the initial scatter level difference between the LEDs (e.g., the scatter level deviation of the LEDs of the fire sensing device would be determined to meet or exceed the threshold deviation amount if their measured scatter level was more than 10% greater or 20% less than their initial scatter level, or if the difference between their measured scatter levels was at least 30%). Embodiments of the present disclosure, however, are not limited to these examples.

Computing device 448 can determine an action to take on the fire sensing device 400 upon determining the deviation in the measured outputs of the LEDs (e.g., in the trend line associated with the measured outputs) of the fire sensing device meets or exceeds the threshold deviation amount. The determined action can be an adjustment (e.g., increase or decrease) of the gain (e.g., the software gain function) associated with the first photodiode and/or second photodiode of the fire sensing device, or a replacement of the fire sensing device. If the deviation in the measured outputs of the LEDs does not meet or exceed the threshold deviation, computing device 448 can determine that no action is needed to be taken on the fire sensing device.

As an example, the determined action can be a gain adjustment when the percentage by which the outputs of the LEDs have changed from the initial output is outside the threshold percentage range, but the difference the percentages by which the outputs have changed from the initial output does not meet or exceed the threshold percentage difference. For instance, if the percentage by which the scatter levels of each of the LEDs has changed from the initial output is +20%, these both would be outside the scatter level threshold percentage range of +10% to −20%, but their difference (0%) would not meet or exceed the scatter level threshold percentage difference of +/−30%, and accordingly the determined action would be an increase of the gain associated with the first and second photodiodes by 10%.

The gain adjustment can be, for example, an adjustment of the gain associated with the first photodiode and/or second photodiode of the fire sensing device, as previously described herein. For example, the fire sensing device can include a first variable gain amplifier and a second variable gain amplifier coupled to the first photodiode, and a third variable gain amplifier and a fourth variable gain amplifier coupled to the second photodiode, as previously described herein (e.g., in connection with FIG. 3). The fire sensing device (e.g., the controller of the fire sensing device) can adjust the gain associated with the first photodiode by adjusting a gain of the first variable gain amplifier and/or a gain of the second variable gain amplifier, and can adjust the gain associated with the second photodiode by adjusting a gain of the third variable gain amplifier and/or a gain of the fourth variable gain amplifier, as previously described herein (e.g., in connection with FIG. 3).

As an additional example, the determined action can be a replacement of the fire sensing device when both the percentage by which the outputs of the LEDs have changed from the initial output is outside the threshold percentage range, and the difference between the percentages by which the outputs have changed from the initial output meets or exceeds the threshold percentage difference. For instance, if the percentage by which the emission levels of the two LEDs has changed from the initial output is −35% and −5%, respectively, the −35% change would be outside the emission level threshold percentage range of +10% to −30%, and their difference (30%) would meet or exceed the emission level threshold percentage difference of +/−15%, and accordingly the determined action would be a replacement of the fire sensing device.

Computing device 448 can send (e.g., transmit) a notification of the determined action (e.g., gain adjustment or replacement) to take on the self-testing fire sensing device 400 to an additional computing device, such as computing device 449 illustrated in FIG. 4. The additional computing device 449 can be, for example, a mobile device (e.g., smart phone) or other web-based computing device (e.g., laptop or tablet) of a maintenance engineer or technician of the facility, who can initiate the determined action upon receipt of the notification. Computing device 448 can send the notification to the additional computing device 449 via network 446, as illustrated in FIG. 4.

In some embodiments, computing device 448 can determine (e.g., predict and/or calculate) the remaining lifetime (e.g., end of life) of the fire sensing device 400 based on the measured outputs of the LEDs of the fire sensing device. For instance, computing device 448 can determine the remaining lifetime of the fire sensing device 400 based on the trend line (e.g., a projection of the trend line) associated with the measured outputs of the LEDs. Computing device 448 can send, via network 446, the determined remaining lifetime of the fire sensing device 400 to the additional computing device 449. For instance, computing device 448 can send the determined remaining lifetime to the additional computing device 449 with the notification of the determined action.

In some embodiments, computing device 448 can send, via network 446, the measured outputs of the LEDs of the fire sensing device 400 to the additional computing device 449. For instance, computing device 448 can send the measured LED outputs to the additional computing device 449 with the notification of the determined action and/or the determined remaining lifetime of the fire sensing device.

Figure 5:
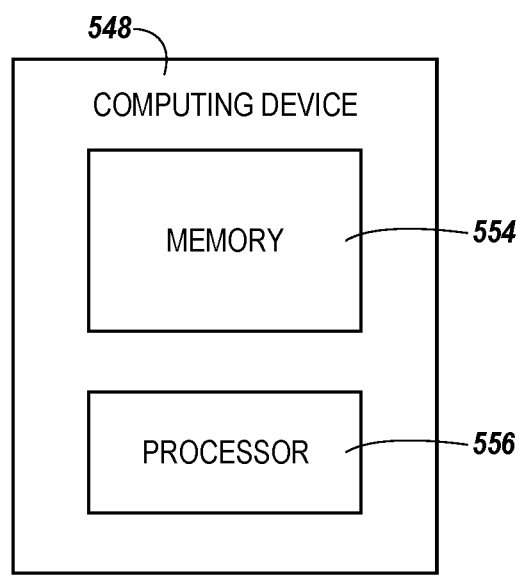
FIG. 5 illustrates a block diagram of a computing device for monitoring a self-testing fire sensing device in accordance with an embodiment of the present disclosure.

FIG. 5 illustrates a block diagram of a computing device 548 for monitoring a self-testing fire sensing device in accordance with an embodiment of the present disclosure. Computing device 548 can be, for example, computing device 448 previously described in connection with FIG. 4.

As shown in FIG. 5, computing device 548 can include a memory 554 and a processor 556. The memory 554 can be any type of storage medium that can be accessed by the processor 556 to perform various examples of the present disclosure. For example, the memory 554 can be a non-transitory computer readable medium having computer readable instructions (e.g., computer program instructions) stored thereon that are executable by the processor 556 for monitoring a self-testing hazard sensing device in accordance with the present disclosure.

The memory 554 can be volatile or nonvolatile memory. The memory 554 can also be removable (e.g., portable) memory, or non-removable (e.g., internal) memory. For example, the memory 554 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 554 is illustrated as being located within computing device 548, embodiments of the present disclosure are not so limited. For example, memory 554 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for monitoring a self-testing fire sensing device, comprising:
a memory; and
a processor configured to execute instructions stored in the memory to:
receive, from a self-testing fire sensing device, measurements of outputs of light-emitting diodes (LEDs) of the self-testing fire sensing device during operation of the self-testing fire sensing device;
determine when a deviation in the measured outputs of the LEDs of the self-testing fire sensing device meets or exceeds a threshold deviation amount;
determine an action to take on the self-testing fire sensing device upon determining the deviation in in the measured outputs of the LEDs meets or exceeds the threshold deviation amount; and
send a notification of the determined action to take on the self-testing fire sensing device to an additional computing device.

2. The computing device of claim 1, wherein the processor is configured to execute the instructions to:
generate a trend line associated with the measured outputs of the LEDs of the self-testing fire sensing device; and
determine when the deviation in the measured outputs of the LEDs meets or exceeds the threshold deviation amount by determining when a deviation in the trend line associated with the measured outputs of the LEDs meets or exceeds the threshold deviation amount.

3. The computing device of claim 1, wherein the determined action to take on the self-testing fire sensing device is a replacement of the self-testing fire sensing device.

4. The computing device of claim 1, wherein the determined action to take on the self-testing fire sensing device is an adjustment of a gain associated with a photodiode of the self-testing fire sensing device.

5. The computing device of claim 4, wherein the gain associated with the photodiode of the self-testing fire sensing is a software gain function.

6. The computing device of claim 1, wherein the processor is configured to execute the instructions to:
determine a remaining lifetime of the self-testing fire sensing device based on the measured outputs of the LEDs of the self-testing fire sensing device; and
send the determined remaining lifetime of the self-testing fire sensing device to the additional computing device.

7. The computing device of claim 1, wherein the deviation in the measured outputs of the LEDs comprises percentages by which the outputs of the LEDs have changed from an initial output of the LEDs.

8. The computing device of claim 7, wherein determining when the deviation in the measured outputs of the LEDs of the self-testing fire sensing device meets or exceeds the threshold deviation amount includes determining when the percentages by which the outputs of the LEDs have changed from the initial output of the LEDs are outside a threshold percentage range.

9. The computing device of claim 7, wherein determining when the deviation in the measured outputs of the LEDs of the self-testing fire sensing device meets or exceeds the threshold deviation amount includes determining when a difference the percentages by which the outputs of the LEDs have changed from the initial output of the LEDs meets or exceeds a threshold percentage difference.

10. A method for monitoring a self-testing fire sensing device, comprising:
   receiving, by a computing device from a self-testing fire sensing device, measurements of outputs of light-emitting diodes (LEDs) of the self-testing fire sensing device during operation of the self-testing fire sensing device;
   generating, by the computing device, a trend line associated with the measured outputs of the LEDs of the self-testing fire sensing device;
   determining, by the computing device, when a deviation in the trend line associated with the measured outputs of the LEDs of the self-testing fire sensing device meets or exceeds a threshold deviation amount;
   determining, by the computing device, an action to take on the self-testing fire sensing device upon determining the deviation in the trend line associated with the measured outputs of the LEDs meets or exceeds the threshold deviation amount; and
   sending, by the computing device, a notification of the determined action to take on the self-testing fire sensing device to an additional computing device.

11. The method of claim 10, wherein the method includes:
   determining a remaining lifetime of the self-testing fire sensing device based on the trend line associated with the measured outputs of the LEDs of the self-testing fire sensing device; and
   sending the determined remaining lifetime of the self-testing fire sensing device to the additional computing device.

12. The method of claim 10, wherein the measured outputs of the LEDs of the self-testing fire sensing device include:
   emission levels of light emitted by the LEDs; and
   scatter levels of light emitted by the LEDs.

13. The method of claim 10, wherein the method includes generating the trend line associated with the measured outputs of the LEDs of the self-testing fire sensing device by:
   performing noise averaging on the measured outputs of the LEDs; and
   performing a rate of change analysis on the measured outputs of the LEDs.

14. The method of claim 10, wherein the method includes sending the measured outputs of the LEDs of the self-testing fire sensing device to the additional computing device.

15. A fire alarm system, comprising:
a computing device; and
a self-testing fire sensing device having a first light-emitting diode (LED) and a second LED, wherein the self-testing fire sensing device is configured to:
   measure outputs of the first LED and the second LED; and
   send the measured outputs of the first LED and the second LED to the computing device; and
wherein the computing device is configured to:
   receive the measured outputs of the first LED and the second LED from the self-testing fire sensing device;
   determine when a deviation in the measured outputs of the first LED or the second LED of the self-testing fire sensing device meets or exceeds a threshold deviation amount;
   determine an action to take on the self-testing fire sensing device upon determining the deviation in in the measured outputs of the first LED or the second LED meets or exceeds the threshold deviation amount; and
   send a notification of the determined action to take on the self-testing fire sensing device to an additional computing device.

16. The fire alarm system of claim 15, wherein:
the self-testing fire sensing device includes a first photodiode on-axis with the first LED and a second photodiode on-axis with the second LED; and
the determined action to take on the self-testing fire sensing device is an adjustment of a gain associated with the first photodiode or a gain associated with the second photodiode.

17. The fire alarm system of claim 16, wherein:
the self-testing fire sensing device includes:
   a first variable gain amplifier and a second variable gain amplifier coupled to the first photodiode; and
   a third variable gain amplifier and a fourth variable gain amplifier coupled to the second photodiode; and
the self-testing fire sensing device is configured to:
   adjust the gain associated with the first photodiode by adjusting a gain of the first variable gain amplifier or a gain of the second variable gain amplifier; and
   adjust the gain associated with the second photodiode by adjusting a gain of the third variable gain amplifier or a gain of the fourth variable gain amplifier.

18. The fire alarm system of claim 15, wherein:
the system includes a gateway device; and
the self-testing fire sensing device is configured to send the measured outputs of the first LED and the second LED to the computing device via the gateway device.

19. The fire alarm system of claim 15, wherein:
the self-testing fire sensing device is located in a facility; and
the computing device is located remotely from the facility and is part of a distributed computing environment.

20. The fire alarm system of claim 15, wherein:
the first LED is an infrared LED; and
the second LED is a blue LED.

* * * * *